United States Patent [19]

Brouwers

[11] Patent Number: 5,011,461
[45] Date of Patent: Apr. 30, 1991

[54] TRANSMISSION PROVIDED WITH A DRIVING BELT AND V-SHAPED PULLEYS

[75] Inventor: Theodorus M. J. Brouwers, De Kaatsheuvel, Netherlands

[73] Assignee: Van Doorne's Transmissie B.V., Netherlands

[21] Appl. No.: 462,266

[22] Filed: Jan. 9, 1990

[30] Foreign Application Priority Data

Feb. 3, 1989 [NL] Netherlands ............... 8900266

[51] Int. Cl.$^5$ ............... F16H 55/38; F16G 5/20
[52] U.S. Cl. ............... 474/188; 474/201; 474/249
[58] Field of Search ............... 474/188, 189, 201, 238, 474/240–245, 250–252, 174, 249

[56] References Cited

U.S. PATENT DOCUMENTS

| | | | |
|---|---|---|---|
| 1,028,783 | 6/1912 | von Rabenau | 474/251 |
| 1,601,662 | 9/1926 | Abbott | 474/201 X |
| 1,966,831 | 7/1934 | Oakes et al. | 474/201 X |
| 1,994,604 | 3/1935 | Bohne | 474/249 X |
| 2,461,169 | 2/1949 | Miller | 474/251 |
| 4,533,342 | 8/1985 | Miranti et al. | 474/201 |
| 4,541,822 | 9/1985 | Stiles | 474/201 |
| 4,898,567 | 2/1990 | Tatara et al. | 474/174 |

FOREIGN PATENT DOCUMENTS 1549403 8/1979 United Kingdom .

Primary Examiner—Bruce M. Kisliuk
Attorney, Agent, or Firm—Pennie & Edmonds

[57] ABSTRACT

Transmission provided with a driving belt and V-shaped pulleys. The side faces of the transverse elements or the contacting surfaces of pulleys in a variable transmission are provided with enlarged straight or oblique grooves between ridges in order to improve the efficiency and to reduce the wear of the transmission.

23 Claims, 1 Drawing Sheet

TRANSMISSION PROVIDED WITH A DRIVING BELT AND V-SHAPED PULLEYS

BACKGROUND OF THE INVENTION

The invention relates to a transmission provided with at least one driving belt and V-shaped pulleys, whereby the driving belt comprises one or more transverse elements provided with converging side faces for intermating with contact surfaces of the V-shaped pulleys, whereby one or more side faces of one or more transverse elements and/or the contact surfaces of the V-shaped pulleys are designed as a non-continuous surface, by means of one or more grooves located between ridges.

Such a transmission is known from the British patent specification 1549403. During operation of the transmission in an oily or otherwise "wet" environment an oil film may be formed between the driving belt and the contact surfaces. Said oil film causes slip and results in the loss of efficiency and wear of the transmission. In the known transmission this problem has been overcome by making the side faces of the driving belt and/or the contact surfaces of the pulley non-continuous. The oil from the oil film can thereby be at least partly accommodated in the surface.

In practice such a continous surface appears to be satisfactory. The continuous surface is usually obtained by subjecting the surface to a rough-blasting operation. Said rough-blasting, however, is a process which is not very well controllable, which may result in undesired deviations, e.g. in the flatness of the surface as well as in the angle between the converging side faces of the driving belt or the contact surfaces of the pulleys. In practice it has appeared that using grooved surfaces instead of blasted surfaces produced a less optimal result in comparison with the blasted surface. There was an advantageous improvement with regard to the flatness tolerances and the angular divergences of the grooved surface, however.

SUMMARY OF THE INVENTION

The object of the invention is to provide a transmission of the kind mentioned in the preamble, with an improved efficiency, reduced wear, as well as an improved form precision.

The transmission according to the invention is characterized in that the grooves take up at least 50% of the entire surface in which they are present. It has namely become apparent that for an optimum efficiency of the transmission the most important factor is not a contact surface which is as large as possible, but the degree to which oil is discharged. Moreover, wear decreases thereby and the contact surface maintains its properties during the entire life of the transmission.

A further embodiment of the invention is characterized in that the effective width of a groove is larger than or equal to one and a half times the effective width of an adjacent ridge. By limiting the width of the ridge accordingly the oil which is present between the wall and the adjacent surface of the driving belt or the pulley, only needs to move a short distance before landing in a groove, as a result of which a fast interruption of the oil film is promoted.

A further embodiment of the invention is characterized in that the flank of a ridge in the boundary with a groove is profiled. By an optimum profiling an improved passage of the oil in the groove is obtained without this leading to undesired turbulences and pressure build-up. A convex flank is advantageous thereby, also from a point of view of wear. It so happens that some running-in wear can hardly be prevented; said wear will stabilize soon, however, if the projected flank section, the section parallel to the side face of the driving belt and/or the pulley slightly increases due to said wear, and will only deform elastically as a result. The effective groove width will hardly decrease thereby, and said decrease can even be calculated in previously.

DESCRIPTION OF THE PREFERRED EMBODIMENTS

Figure 1:
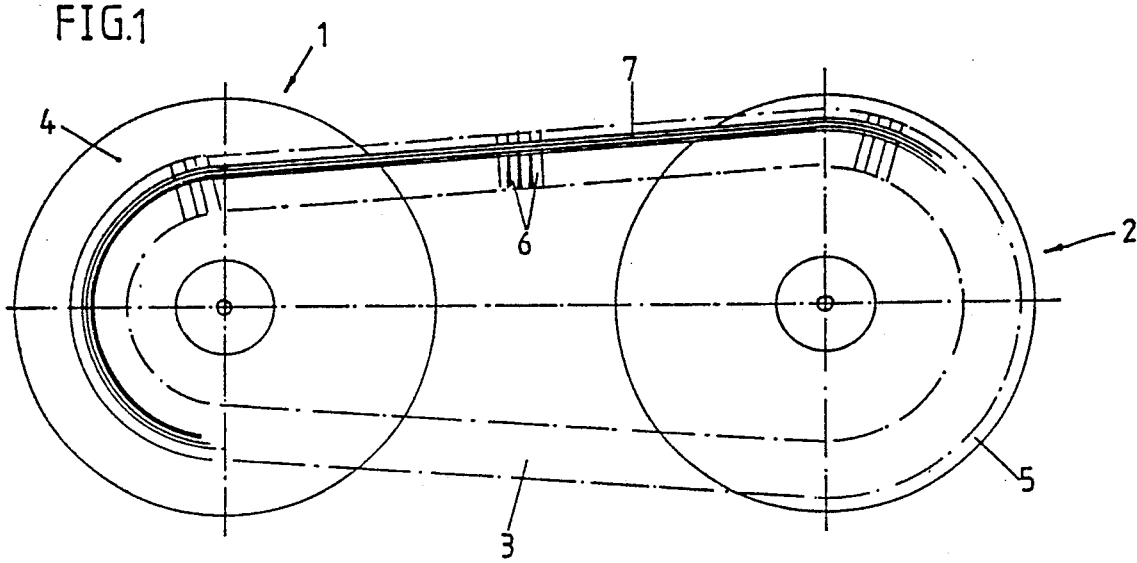
FIG. 1 is a diagrammatic illustration of a transmission according to the invention.
Figure 2:
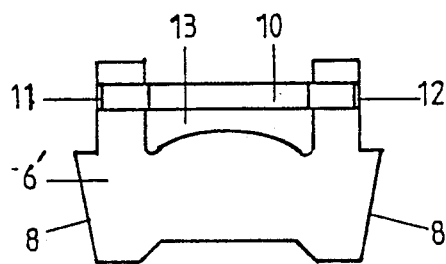
FIG. 2 is a cross view of a transverse element for a driving belt.
Figure 3:
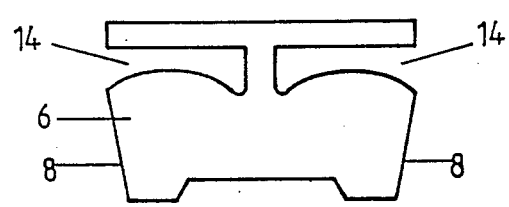
FIG. 3 is a cross view of another embodiment of a transverse element for a driving belt.
Figure 4A:
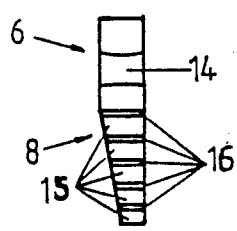
FIGS. 4a and 4b are longitudinal views of the transverse element of FIG. 3, with straight and oblique grooves respectively.
Figure 4B:
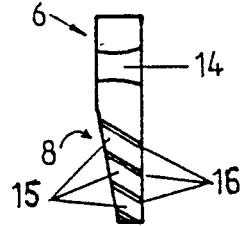

The transmission of FIG. 1 comprises a pair of pulleys 1, 2 with a driving belt 3 provided thereon. In this embodiment the driving belt is provided with a carrier 7 with transverse elements 6 movably provided thereon. One embodiment for such a transverse element is illustrated in FIG. 2. The transverse element 6' in question is provided with a recess 13 for accommodating a carrier which may e.g. consist of a band pack. The upper side of said recess 13 can be closed by means of a closing pin 10 which can be placed in bores 11 and 12 of the transverse element 6'. Another embodiment for a transverse element is illustrated in FIG. 3. In this case the transverse element 6 in question comprises a pair of recesses 14, in which the carrier 7 can be accommodated. The carrier 7 thereby consists of two endless means, e.g. two band packs. Both embodiments, the transverse elements 6 and 6', are provided with converging side faces 8 which can intermate with the contact surfaces 4 and 5 of the pulleys 1 and 2, respectively. An oil film may thereby be formed between the contact surfaces 4 and 5 on the one hand and the side faces 8 on the other hand, as a result of which the driving belt will slip relative to the pulleys, the efficiency of the transmission will decrease and considerable wear will occur. In order to prevent this the side faces 8 and/or the contact surfaces 4, 5 may be non-continuous, in a manner which is known per se. In FIGS. 4a and 4b the transverse elements are e.g. illustrated with side faces provided with straight and obliques grooves 15, respectively, between ridges 16. Hereafter, for the sake of simplicity, grooved surfaces of the transverse elements will always be mentioned; it will be apparent, however, that the same applies correspondingly to the contact surfaces 4, 5 of the pulleys 1 and 2, respectively. For the further elaboration of the invention it is not important either which is the exact pattern of the grooves 15 and the ridges 16, e.g. straight, oblique, stepped, curved or otherwise.

Figure 5:
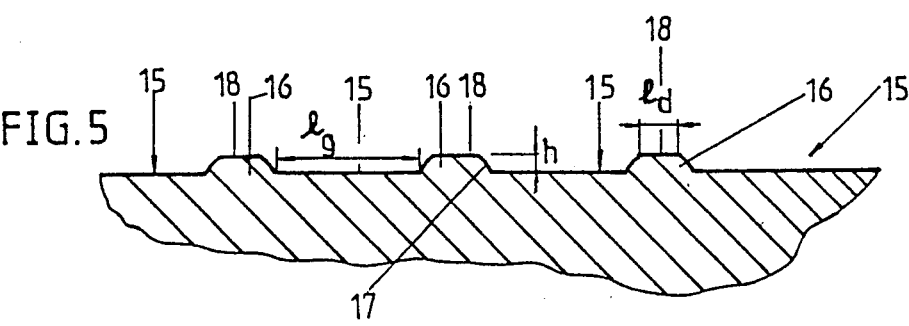
FIG. 5 is a diagrammatic cross-section of a groove pattern according to the invention.

The diagrammatic cross-section of a grooved pattern according to the invention, as shown in FIG. 5, comprises ridges 16, having an effective width 1d, as well as grooves located therebetween, said grooves having an effective width 1g. According to the invention the grooves must thereby take up at least 50% of the total surface. As a result of this the total surface of the ridges with which the transverse element comes into contact is indeed relatively small, but as it has become apparent this matters less than the surface of the grooves. The oil film which may be formed between the side faces 8 and the contact surfaces 4 and 5 of the pulleys 1 and 2 appears to be a predominant factor in such a contact. If sufficient receiving and discharging possibilities for the oil are provided said contact is improved considerably, the efficiency will be increased and the amount of wear will be decreased. The best result is even obtained with transverse elements whose grooves take up 75–90% of the entire surface of the side faces. The oil can be sufficiently discharged in that case, whilst it has appeared that the ridges 16 are not excessively loaded to such a degree that considerable wear can be expected.

Apart from provisions to make an adequate discharge of oil possible it is moreover desirable to be able to discharge the oil quickly, such that there is no chance of an oil film being formed, or, if an oil film is formed, to break it and reduce it as soon as possible. In order to achieve this the effective width 1d of the ridges 16 must be sufficiently small according to the invention, so that the oil only needs to be displaced over a limited distance before it is received in the grooves. According to the invention the effective width of the ridge 16 is smaller than or equal to two thirds of the effective width of the groove 15 in order to accomplish that objective. Preferably the effective width of the ridge is not larger than 100 $\mu$m and that of the groove is not larger than 300 $\mu$m (micrometers).

Also, the groove depth h is important. Said groove depth is preferably larger than 10 $\mu$m, so that a sufficient groove volume is obtained in order that sufficient oil can be received.

The flow of the oil from the ridge 16 into the groove 15 can be improved considerably by providing the ridge 16 with a regular flank profile as a boundary with the groove, so that an irregular flow with an undesired pressure build-up is prevented. E.g. a concave or convex flank profile can be thought of here. From this point of view it is attractive thereby for the flank to describe a circular segment. Since some running-in wear can hardly be prevented a convex flank profile 17, such as is illustrated in FIG. 5, is to be preferred. After only little running-in wear on the ridge 16 the abutting surface 18 of the ridge 16, which abutting surface runs parallel to the side face 8, will have increased such that the ridge 16 is only deformed elastically under the contact load with the pulley, and wear is minimized. The running-in wear which may occur but which will quickly stabilize has hardly any influence on the effective width of the groove 15. Moreover a slight decrease of the groove width, due to running-in wear, can also be taken into account in advance.

From a production point of view especially a straight groove profile, parallel to the transverse direction of the transverse element, is attractive, since such a groove profile can be simply provided in or be combined with a die-cutting operation, by means of which the transverse elements are usually produced in practice. This and other groove patterns can also be provided in the side faces of the transverse elements in a relatively simple manner by means of several other production methods, whereby it will always be possible to avoid undesired flatness tolerances and angular divergences to a sufficient degree, and whereby an improvement is thus achieved with respect to the rough-blasting of the side faces which has been usual so far.

Figure 6:
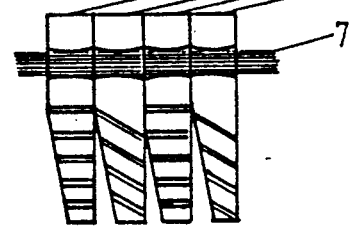
FIG. 6 is a side elevational view of a part of a mixed driving belt.

It will be apparent that the invention has not been described exhaustively with reference to the drawing and only a few embodiments, and that various alternatives are conceivable within the framework of the invention. Instead of the grooves provided in the surface corresponding grooves may thus be obtained by providing ridges on the side faces of the transverse elements, e.g. by welding on material. Also it will for example be possible for a driving belt according to the invention to be built up of several kinds of transverse elements (FIG. 6), whereby each kind of transverse element is characterized by a specific profile of the side faces. Within the framework of the invention a certain kind of transverse element can be specified by a multitude of variables, such as the effective groove width, the effective width of the ridges, the thickness of the transverse element, the groove surface, the groove pattern, the flank profile of the ridges, the groove depth etc. In this way a mixed belt is obtained, which mixed belt can be tailored to specific applications. Thus it will e.g. be possible to compose a mixed belt which produces relatively little noise when used in a transmission. Such modifications are considered to fall within the scope of the invention.

I claim:

1. Transmission provided with at least one driving belt and V-shaped pulleys in a wet environment, whereby said driving belt comprises a plurality of side by side transverse elements each provided with converging side faces for intermating with contact surfaces of said V-shaped pulleys, whereby said side faces of said transverse elements have a non-continuous surface provided with grooves located between ridges, whereby each of said grooves has a width which is at least as large as one and a half-times the width of the ridges on either side thereof.

2. Transmission according to claim 1, wherein the grooves take up between about 75 to 90% of the total surface area of said faces.

3. Transmission according to claim 1, wherein said groove width is smaller than about 300 $\mu$m.

4. Transmission according to claims 1, wherein said ridge is smaller than about 100 $\mu$m.

5. Transmission according to claim 1, wherein said groove has a depth which is at least 10 $\mu$m.

6. Transmission according to claim 5, wherein said groove has a depth of about 10 $\mu$m.

7. Transmission according to claim 1, wherein said ridge has a flank which is curved in profiled.

8. Transmission according to claim 7, wherein said flank is convexly shaped.

9. Transmission according to claim 7, wherein said flank is concavely shaped.

10. Transmission according to claim 7, wherein said flank describes a circular segment.

11. Transmission according to claim 1, wherein said grooves and ridges extend along straight lines, completely across each side face and in parallel relationship to each other.

12. Transmission according to claim 11 wherein the grooves are spaced at uniform distances from each other.

13. Transmission according to claim 12 wherein the grooves on every other transverse element extend diagonally across the side faces thereof and the grooves on the remaining transverse elements extend transversely of the side faces.

14. Transmission provided with at least one driving belt and V-shaped pulleys in a wet environment, whereby said driving belt comprises transverse elements provided with converging side faces for intermating with contact surfaces of said V-shaped pulleys, whereby said contact surfaces of said V-shaped pulleys have a non-continuous surface provided with grooves located between ridges, whereby each of said grooves has a width which is larger than one and a half times the width of the ridges on either side thereof.

15. Transmission according to claim 14, wherein said groove width is smaller than about 300 μm.

16. Transmission according to claim 15, wherein said ridge width is smaller than about 100 μm.

17. Transmission according to claim 15, wherein said groove has a depth which is at least 10 μm.

18. Transmission according to claim 14, wherein said ridge has a flank which is curved in profiled.

19. Transmission according to claim 18, wherein said flank is convexly shaped.

20. Transmission according to claim 18, wherein said flank is concavely shaped.

21. Transmission according to claim 18, wherein said flank describes a circular segment.

22. Driving belt for a transmission according to claim 1, characterized in that the driving belt is built up of several kinds of transverse elements, whereby each kind is characterized by a different groove and ridge pattern on the side faces.

23. Driving belt according to claim 22, characterized in that the driving belt comprises at least two kinds of transverse elements, whereby the groove width on one kind is different from that on the other.

* * * * *